United States Patent
Kawakami

(10) Patent No.: US 11,409,913 B2
(45) Date of Patent: Aug. 9, 2022

(54) COMMUNICATION APPARATUS CAPABLE OF RESTRICTING EXECUTION OF APPLICATION FUNCTION BASED ON IDENTIFICATION INFORMATION OF EXTERNAL WIRELESS DEVICE, AND CORRESPONDING COMMUNICATION METHOD AND RECORDING MEDIUM

(71) Applicant: CASIO COMPUTER CO., LTD., Tokyo (JP)

(72) Inventor: Gou Kawakami, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 364 days.

(21) Appl. No.: 16/359,728

(22) Filed: Mar. 20, 2019

(65) Prior Publication Data

US 2019/0303598 A1 Oct. 3, 2019

(30) Foreign Application Priority Data

Mar. 27, 2018 (JP) .............................. JP2018-060305

(51) Int. Cl.
G06F 21/62 (2013.01)
H04W 76/11 (2018.01)
H04W 12/37 (2021.01)

(52) U.S. Cl.
CPC .......... *G06F 21/629* (2013.01); *H04W 12/37* (2021.01); *H04W 76/11* (2018.02); *G06F 2221/2141* (2013.01)

(58) Field of Classification Search
None
See application file for complete search history.

(56) References Cited

U.S. PATENT DOCUMENTS

| 2006/0191017 | A1  | 8/2006  | Hieda   |                |
|---|---|---|---|---|
| 2007/0060099 | A1* | 3/2007  | Ramer   | G06F 16/9535 455/405 |
| 2013/0210464 | A1* | 8/2013  | Mittal  | H04L 67/18 455/456.5 |
| 2015/0269617 | A1* | 9/2015  | Mikurak | G06Q 50/12 705/14.54 |
| 2017/0315901 | A1* | 11/2017 | Wang    | G06F 11/3664 |

FOREIGN PATENT DOCUMENTS

| JP | 2000010932 A | 1/2000 |
|---|---|---|
| JP | 2005235050 A | 9/2005 |
| JP | 2006203507 A | 8/2006 |
| JP | 2007142905 A | 6/2007 |
| JP | 2008160753 A | 7/2008 |

OTHER PUBLICATIONS

Japanese Office Action (and English language translation thereof) dated Apr. 5, 2022, issued in counterpart Japanese Application No. 2018-060305.

* cited by examiner

*Primary Examiner* — Jeffrey C Pwu
*Assistant Examiner* — Mayasa A. Shaawat
(74) *Attorney, Agent, or Firm* — Holtz, Holtz & Volek PC

(57) ABSTRACT

In a communication method, a processor activates an application program; acquires identification information of an external wireless device from the external wireless device; reads, from a memory, function restriction information indicative of presence/absence of restriction of a function of the application program associated with the acquired identification information; and sets an executable function of the application program in accordance with the read function restriction information.

19 Claims, 5 Drawing Sheets

```
<WifiAccessPoint>
  <ssid name="wifi_for_lesson">
      <app name="calculator">0</app>
      <app name="dictionary">0</app>
  </ssid>
  <ssid name="wifi_for_examination">
      <app name="calculator">1</app>
      <app name="dictionary">1</app>
  </ssid>
</WifiAccessPoint>
```

12d (APP FUNCTION RESTRICTION INFORMATION)

FIG. 2

COMMUNICATION APPARATUS CAPABLE OF RESTRICTING EXECUTION OF APPLICATION FUNCTION BASED ON IDENTIFICATION INFORMATION OF EXTERNAL WIRELESS DEVICE, AND CORRESPONDING COMMUNICATION METHOD AND RECORDING MEDIUM

CROSS-REFERENCE TO RELATED APPLICATION

This application is based upon and claims the benefit of priority from the prior Japanese Patent Application No. 2018-60305, filed Mar. 27, 2018, the entire contents of which are incorporated herein by reference.

BACKGROUND OF THE INVENTION

1. Field of the Invention

The present invention relates to a communication apparatus which operates according to a program, a communication method, and a recording medium.

2. Description of the Related Art

Communication apparatuses, such as tablet terminals, in which a plurality of kinds of application programs (apps) are loaded and which can execute various functions according to the apps, are generally, widely used.

In addition, curriculums, in which education and learning, for example, are conducted by utilizing such communication apparatuses, have been concretized.

Conventionally, in an electronic calculator (scientific calculator) having a high-level calculation function, such as a functional calculus, in addition to a basic calculation function such as addition, subtraction, multiplication and division, it is thought to make it possible to confirm, from the outside, whether or not the calculator is in a state in which a part of high-level calculation functions is restricted, and to switch the state of the calculator (see, e.g. Jpn. Pat. Appln. KOKAI Publication No. 2000-10932).

In a process of advancing learning by utilizing the communication apparatuses such as the above-described tablet terminals, it is necessary to restrict a part of functions which are executable according to apps, in a specific environment such as in an examination.

SUMMARY OF THE INVENTION

An advantage of the present invention is to provide a communication apparatus which can properly restrict, as needed, a part of functions which an application program includes, a communication method, and a recording medium.

A communication method according to the present invention includes: causing a processor to activate an application program; acquire identification information of an external wireless device from the external wireless device; read, from a memory, function restriction information indicative of presence/absence of restriction of a function of the application program associated with the acquired identification information; and set an executable function of the application program in accordance with the read function restriction information.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a view illustrating a data structure of app function restriction information (table) 12*d* which is registered in accordance with a terminal process according to a communication apparatus control program 12*a* of the tablet terminal 10;

DETAILED DESCRIPTION OF THE PREFERRED EMBODIMENTS

Hereinafter, embodiments of the present invention will be described with reference to the accompanying drawings.

Figure 1:
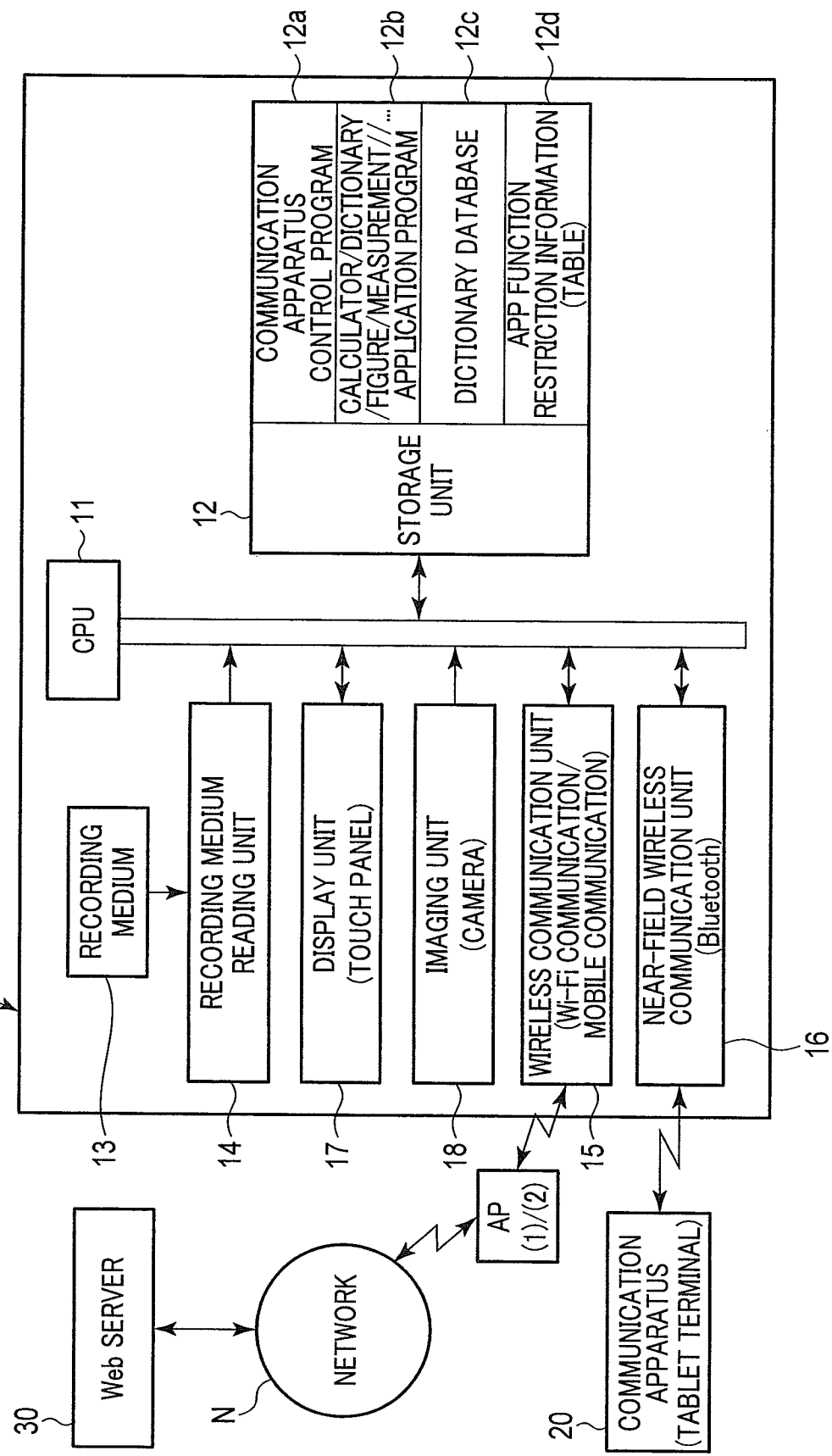
FIG. 1 is a block diagram illustrating a configuration of electronic circuitry of a tablet terminal 10 according to an embodiment of a communication apparatus of the present invention.

FIG. 1 is a block diagram illustrating a configuration of electronic circuitry of a tablet terminal 10 according to an embodiment of a communication apparatus of the present invention.

Note that the communication apparatus of the present invention is applicable to not only the tablet terminal 10, but also applicable widely to electronic devices including communication functions.

The electronic circuitry of the tablet terminal 10 includes a CPU (processor) 11 as a control unit.

The CPU 13 executes control of operations of respective circuit units according to a program prestored in a storage unit 12, or a program read from an external recording medium 13 such as a memory card by a recording medium reading unit 14 and stored in the storage unit 12, or a program downloaded from a Web server 30 (a program server in this example) on a communication network N via an access point (wireless connection device) AP of, e.g. Wi-Fi (trademark), and a wireless communication unit (Wi-Fi communication/mobile communication) 15, and stored (installed) in the storage unit 12.

A near-field wireless communication unit (Bluetooth (trademark)) 16, a touch panel-equipped display unit 17 and an imaging unit (camera) 18, as well as the storage unit 12, recording medium reading unit 14 and wireless communication unit 15, are connected to the CPU 11.

The storage unit 12 stores a communication apparatus control program 12a for controlling the operation of the entirety of the tablet terminal (communication apparatus) 10; and application programs (calculator app, dictionary app, figure app, measurement app, imaging app, etc.) 12b for controlling the operations of the respective units in cooperation with the communication apparatus control program 12a.

The storage unit 12 further stores a dictionary database 12c including, for instance, English-related dictionary data and Japanese-related dictionary data, which are accessed in accordance with the execution of the dictionary app; and app function restriction information (table) 12d written (registered) by wireless connection to an external communication apparatus 20.

In the present embodiment, the calculator app includes, in addition to a basic calculation function such as addition, subtraction, multiplication and division, which is used as a general calculator, a higher-level functional calculus function (high-level calculation function). The figure app includes a figure rendering function. The measurement app includes an image analysis/measurement function for measuring a length, angle, etc. by analyzing image data such as photographs.

FIG. 2 is a view illustrating a data structure of the app function restriction information (table) 12d which is registered in accordance with a terminal process according to the communication apparatus control program 12a of the tablet terminal 10.

In the case of the present embodiment, the app function restriction information (table) 12d is formed of data of XML (extended markup language) format, and describes app names and restriction information thereof in association with an identification name (SSID; service set identifier) (connection ID) of the access point (wireless connection device) AP.

The identification names of the access point AP include an identification name <ssid name="wifi_for_lesson"> of a lesson mode, and an identification name <ssid name="wifi_for_examination"> of an examination mode. In the lesson mode, since the main purpose is learning, the function restriction of the application program is not executed. On the other hand, in the examination mode, the function restriction of the application program is set to be executed in order to prevent the application program from being used for a malicious act such as cunning during the examination.

Here, in connection with the identification name <ssid name="wifi_for_lesson"> of the access point AP, <app name="calculator">0</app>, which means a scientific calculator mode (functional calculus-enabling mode) "0", is associated as the restriction information of the calculator app, and <app name="dictionary">0</app>, which means an English dictionary selectable mode "0", is associated as the restriction information of the dictionary app. The scientific calculator mode is a mode in which both the basic calculation function, which is used as a general calculator, and the functional calculus function can be executed.

In addition, in connection with the identification name <ssid name="wifi_for_examination"> of the access point AP, <app name="calculator">1</app>, which means a general calculator mode (functional calculus-disabling mode) "1", is associated as the restriction information of the calculator app, and <app name="dictionary">1</app>, which means an English dictionary unselectable mode "1", is associated as the restriction information of the dictionary app. The general calculator mode is a mode in which the basic calculation function, which is used as a general calculator, can be executed, but the functional calculus function cannot be executed.

Specifically, the mode "0" is a mode with an executable range which is extended, compared to the mode "1". In other words, the mode "1" is a mode with a narrower executable range than the mode "0". The information "0", "1", which means the mode of each app, indicates the level of function restriction (function restriction level), and "0" indicates the absence of restriction, and "1" means the presence of restriction. By adding other modes "2", "3", . . . , finer function restriction levels can be set as needed.

The app function restriction information (table) 12d may be stored (registered) in the storage unit 12 by tabulating the app function restriction information 12d which is received from the external communication apparatus 20 in response to the communication connection to the external communication apparatus 20, or the app function restriction information (table) 12d may be stored (registered) in advance in the storage unit 12. Besides, the data format of the app function restriction information 12d is not limited to the above-described XML.

In the tablet terminal 10 (communication apparatus) with the above configuration, the CPU 11 controls the operations of respective circuit units according to instructions described in the above-described communication apparatus control program 12a and application programs 12b.

Software and hardware operate in cooperation with each other, thereby implementing the function of restricting the app functions, as will be described in the following description of the operation.

Next, the operation of the tablet terminal 10 (communication apparatus) with the above-described configuration will be described.

Figure 3:
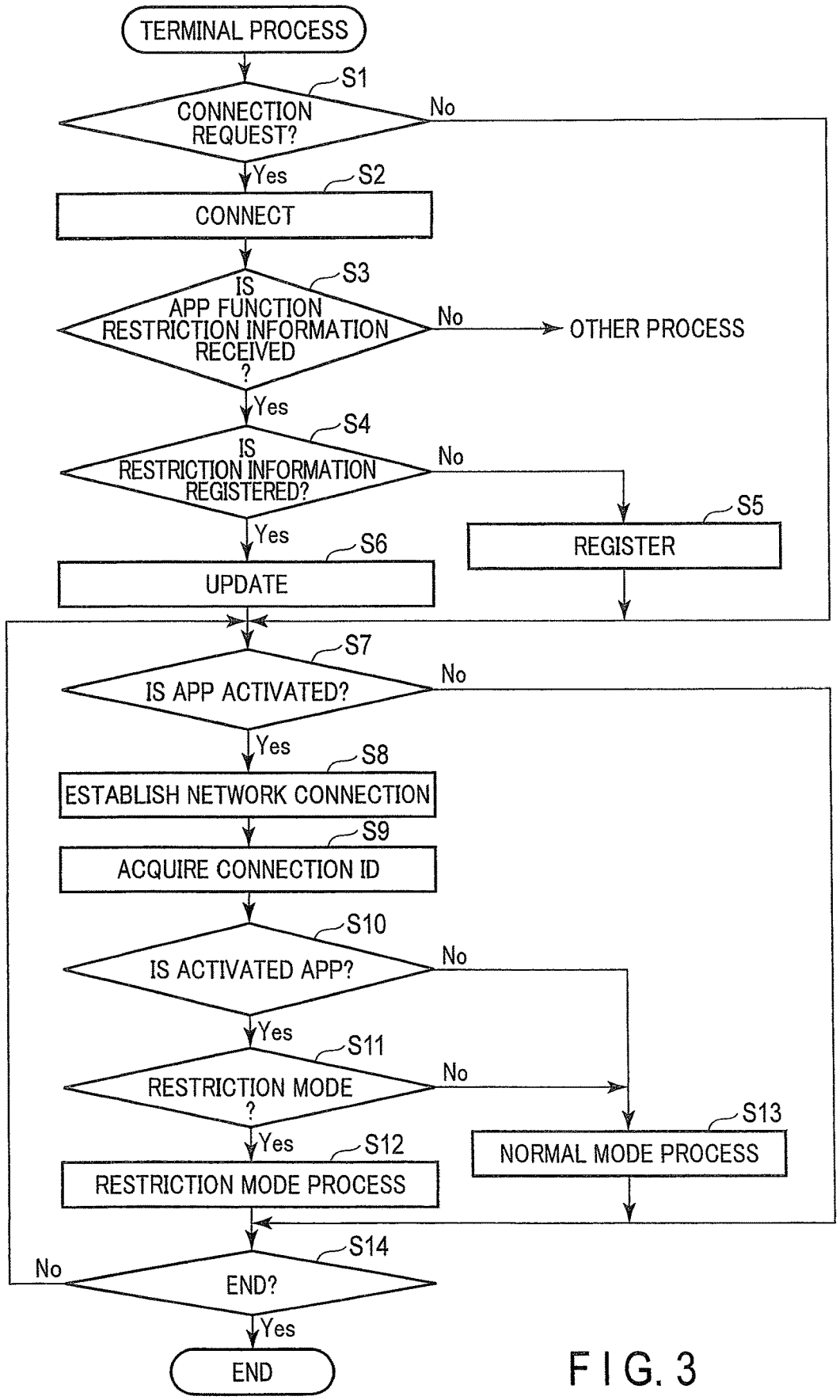
FIG. 3 is a flowchart illustrating the terminal process according to the program 12*a*, 12*b* of the tablet terminal 10.

FIG. 3 is a flowchart illustrating the terminal process according to the program 12a, 12b of the tablet terminal 10, and the terminal process is executed by the CPU 11 of the tablet terminal 10.

In the present embodiment, it is assumed that the tablet terminal 10 (communication apparatus) is used by each lecture attendant in the environment of learning. It is also assumed that the app function restriction information 12d, which is registered in the tablet terminal 10, is created in advance in the table terminal 20 (communication apparatus) which a lecturer uses, and the app function restriction information 12d is received by the tablet terminal 10 of each lecture attendant, tabulated and stored (registered), in response to the communication connection to the lecturer's tablet terminal 20.

The tablet terminal 10 (communication apparatus) is referred to as "lecture attendant terminal 10", and the tablet terminal 20 (communication apparatus) is referred to as "lecturer terminal 20".

It is assumed that when the lecturer gives a lecture to each lecture attendant, the lecturer carries with himself/herself an access point AP(1) of identification name <ssid name="wifi_for_lesson"> into a lecture room, as the access point AP via which each lecture attendant terminal 10 can establish a communication connection to the communication network N in the facility in which each lecture attendant is present, or to an external communication network N. In addition, it is assumed that when the lecturer gives an examination to each lecture attendant, the lecturer carries with himself/herself an access point AP(2) of identification name <ssid name="wifi_for_examination"> into the lecture room.

To begin with, a description is given of an operation of registering the app function restriction information 12*d* from the lecturer terminal 20 to the lecture attendant terminal 10, for example, when the lecturer entered the lecture room.

If the CPU 11 of the lecture attendant 10 determines that a connection request signal, which is sent from the lecturer terminal 20, is received via the near-field wireless communication unit 16 (step S1 (Yes)), the CPU 11 executes an authentication process with the lecturer terminal 20 and establishes a communication connection (step S2).

If the app function restriction information 12*d* (see FIG. 2) is received from the lecturer terminal 20 (step S3 (Yes)), the CPU 11 determines whether the app function restriction information 12*d* is already registered (stored) in the storage unit 12 (step S4).

If the CPU 11 determines that the app function restriction information 12*d* is not registered in the storage unit 12 (step S4 (No)), that is, if the CPU 11 can not read the app function restriction information 12*d* because there is no the app function restriction information 12*d* in the storage unit 12, the CPU 11 tabulates the received app function restriction information 12*d*, and stores and registers the tabulated app function restriction information 12*d* in the storage unit 12 (step S5).

On the other hand, if the CPU 11 determines that the app function restriction information 12*d* is already registered in the storage unit 12 (step S4 (Yes)), that is, if the CPU 11 reads the app function restriction information 12*d* in the storage unit 12 because the app function restriction information 12*d* exists in the storage unit 12, the CPU 11 tabulates the received app function restriction information 12*d*, and overwrites (updates) the already stored app function restriction information 12*d* with the tabulated app function restriction information 12*d*, thus registering the tabulated app function restriction information 12*d* in the storage unit 12 (step S6).

Thereby, the lecture attendant terminal 10 is always kept in the state in which the latest app function restriction information 12*d* is registered.

In the lecture attendant terminal 10, for example, if the application program 12*b* corresponding to a lecture course is activated (step S7 (Yes)), the CPU 11 establishes a connection from the wireless communication unit 15 to the communication network N via the access point PA(1) or PA(2) which the lecturer carried with himself/herself (step S8), and acquires the identification name <ssid name> that is the connection ID of the connected access point PA(1) or PA(2) (step S9).

Here, the CPU 11 analyzes that the app function restriction information (table) 12*d* (see FIG. 2) registered (stored) in the storage unit 12, if the CPU 11 determines that the target app of the restriction information associated with the identification name <ssid name> of the currently connected access point AP, which was acquired in step S9, is the app (currently activated app) activated in step S7 (step S10 (Yes)), the CPU 11 analyzes whether the function restriction level is the information "1" indicative of the mode with the function restriction, or the information "0" indicative of the mode without the function restriction (step S11).

In step S10, if the CPU 11 determines that the target app of the restriction information associated with the identification name <ssid name> of the currently connected access point AP, which was acquired in step S9, is not the app (currently activated app) activated in step S7 (step S10 (No)), the CPU 11 executes the application program, which was activated in step S7, in the normal mode with no function restriction (step S13).

Even when it is determined that the app function restriction information 12*d* is registered (stored) in the storage unit 12 (step S10 (Yes)), if the target app of the restriction information associated with the identification name <ssid name> of the currently connected access point AP is not the currently activated app, or if the target app of the restriction information associated with the identification name <ssid name> of the currently connected access point AP is the currently activated app but the function restriction level of the currently activated app is the information "0" indicative of the mode without the function restriction (step S11 (No)), the CPU 11 executes the application program, which was activated in step S7, in the normal mode with no function restriction (step S13).

For example, if the application program (currently activated app) activated in step S7 is the figure app or measurement app, for instance, and is not the target app of the restriction information indicated in the app function restriction information 12*d* (see FIG. 2) (in this example, the calculator app "calculator" or the dictionary app "dictionary") (step S11 (No)), the figure app or measurement app, which is the currently activated app, is executed in the normal mode with no function restriction (step S13).

In addition, for example, even when the currently activated app is the calculator app or dictionary app and is the target app ("calculator" or "dictionary") indicated in the app function restriction information 12*d* (see FIG. 2), if it is determined that the function restriction level associated with the identification name <ssid name="wifi_for_lesson"> of the currently connected access point AP is "0" indicative of the mode without the function restriction (step S11 (No)), the calculator app or dictionary app, which is the currently activated app, is executed in the normal mode with no function restriction (step S13).

Figure 4A:
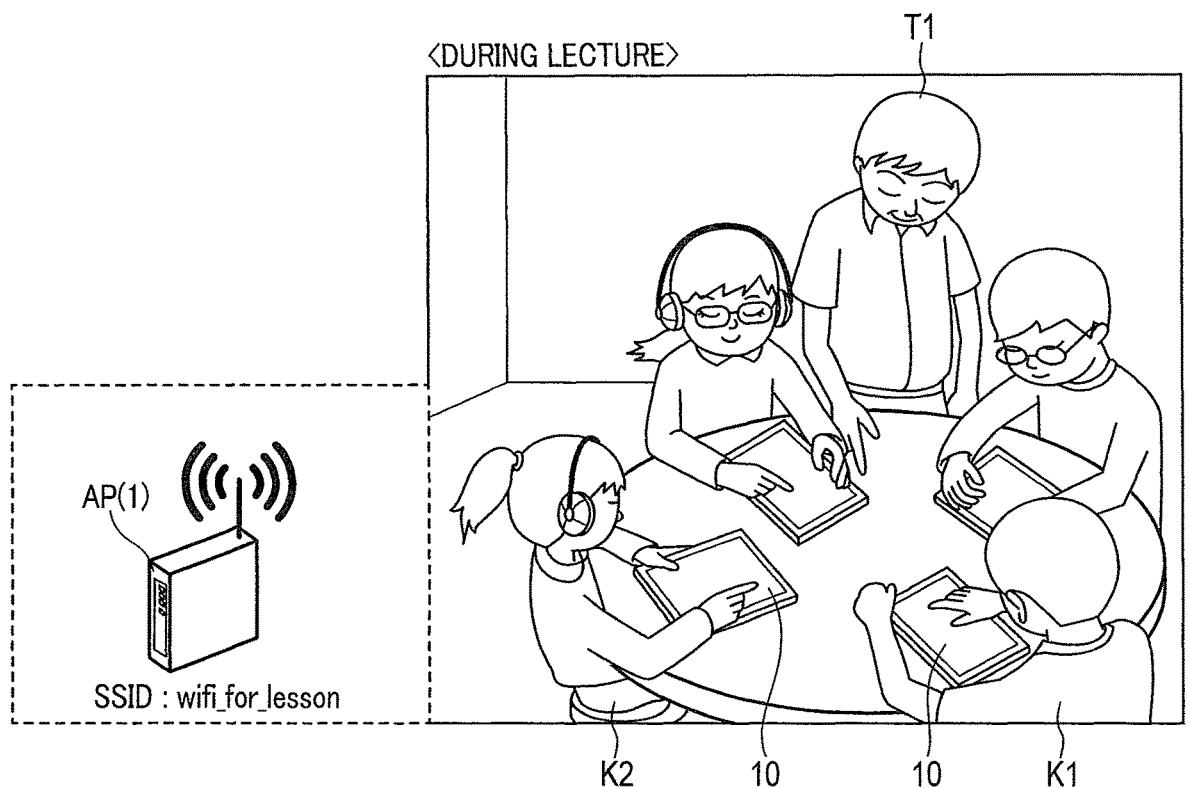
FIG. 4A is a view illustrating a lecture scene of mathematics with use of the tablet terminals 10.

FIG. 4A is a view illustrating a lecture scene of mathematics with use of the tablet terminals 10.

Here, lecture attendants K1, K2, . . . , use the lecture attendant terminals 10, respectively, and a lecturer T1 takes the access point AP(1) [identification name <ssid name="wifi_for_lesson">] with himself into the lecture room.

Figure 4B:
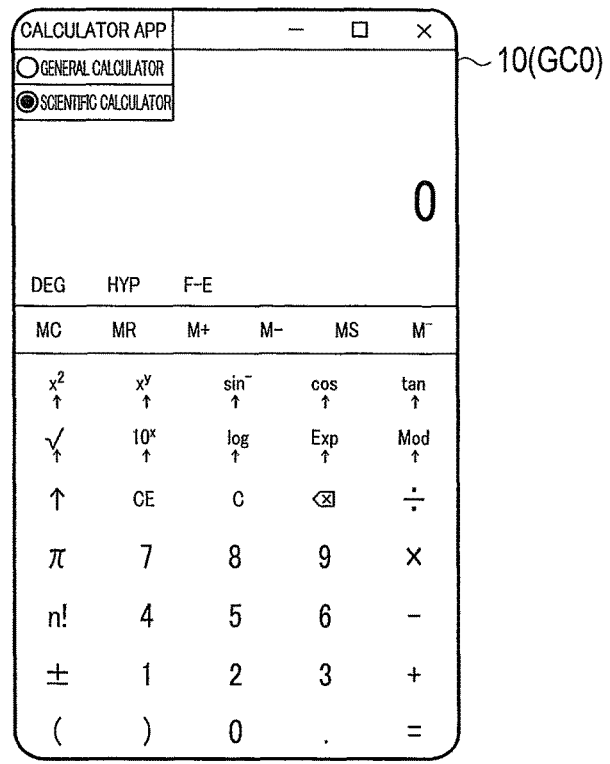
FIG. 4B is a view illustrating a calculator screen (functional calculus-enabling mode) GC0 in a case where a calculator app is activated by a lecture attendant terminal 10 of each lecture attendant in the lecture of the mathematics.

FIG. 4B is a view illustrating a calculator screen (functional calculus-enabling mode) GC0 in a case where the calculator app is activated by the lecture attendant terminal 10 of each lecture attendant in the lecture of the mathematics.

Specifically, in the lecture of mathematics, if the calculator app (12*b*) is activated by the lecture attendant terminal 10 of each lecture attendant K1, K2, . . . (step S7 (Yes)), the CPU 11 establishes a connection to the access point AP(1) and acquires the identification name thereof <ssid name="wifi_for_lesson"> (step S8, S9).

Then, based on the app function restriction information 12*d* (see FIG. 2) registered in the storage unit 12, the CPU 11 determines the scientific calculator mode (functional calculus-enabling mode) "0" without the function restriction, from the restriction information <app name="calculator">0</app> associated with the identification name <ssid name="wifi_for_lesson"> of the access point AP(1) (step S10, S11 (No)), and causes the touch panel-equipped display unit 17 to display, as illustrated in FIG. 4B, the calculator screen (functional calculus-enabling mode) GC0 without the function restriction, in which a check mark is set in the check box of the scientific calculator (step S13). In this manner, the lecture attendant terminal 10 visualizes the absence of the function restriction.

Thereby, during the lecture of mathematics, each lecture attendant can advance learning by utilizing all calculation functions which are executable by the calculator app (12b).

On the other hand, if the CPU 11 of the lecture attendant terminal 10 determines, based on the app function restriction information 12d registered in the storage unit 12, that the target app of the restriction information associated with the identification name<ssid name> of the currently connected access point AP is the application program 12b (currently activated app) activated in step S7, and that the function restriction level is "1" or more indicating the mode with the function restriction (step S11 (Yes)), the CPU 11 executes the currently activated app in the restriction mode with the function restriction (step S12).

Figure 5A:
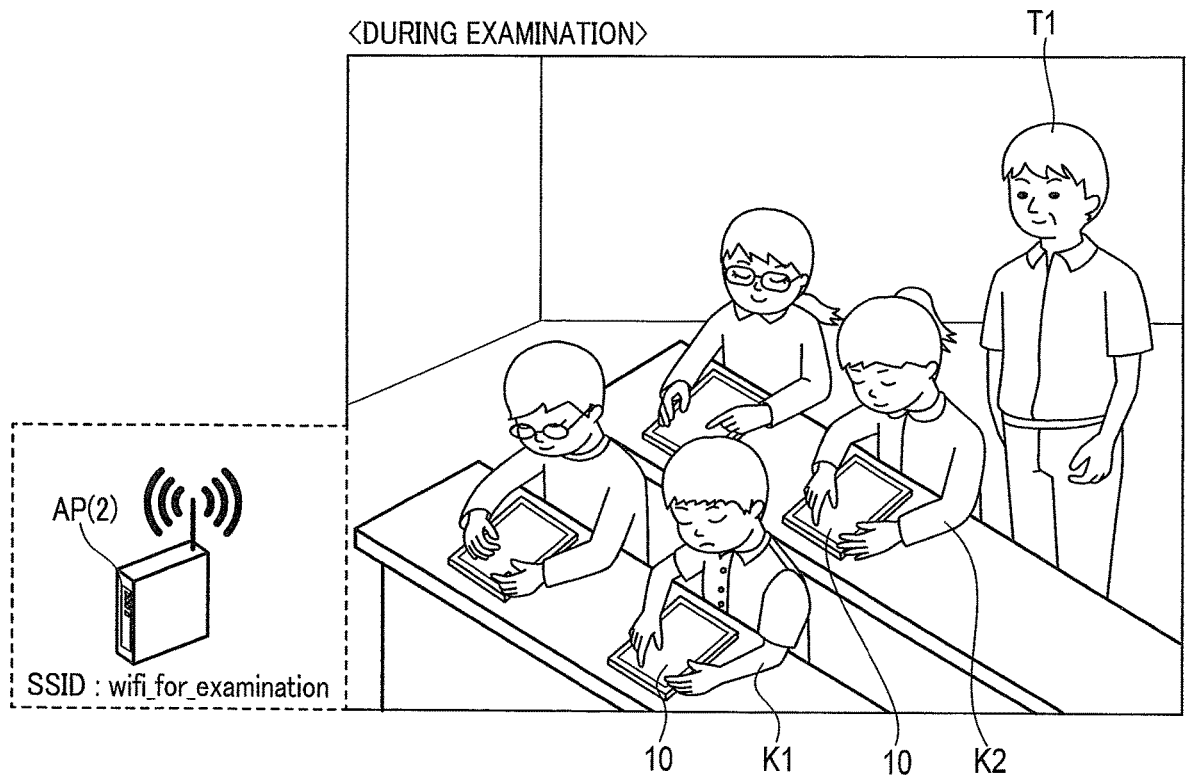
FIG. 5A a view illustrating an examination scene of mathematics with use of the tablet terminals 10.

FIG. 5A a view illustrating an examination scene of mathematics with use of the tablet terminals 10.

In this case, too, the lecture attendants K1, K2, . . . , use the lecture attendant terminals 10, respectively. However, the lecturer T1 takes with himself, not the access point AP(1) [identification name <ssid name="wifi_for_lesson">], but the access point AP(2) [identification name <ssid name="wifi_for_examination">], into the lecture room.

Figure 5B:
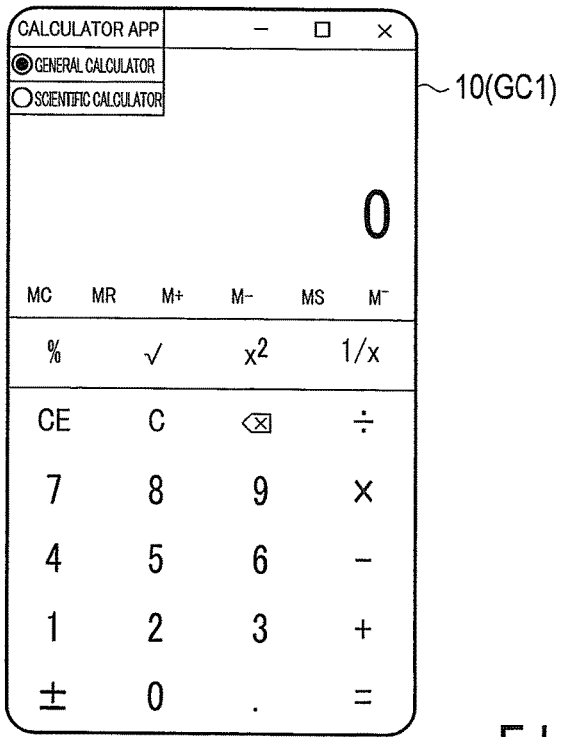
FIG. 5B is a view illustrating a calculator screen (general calculator mode (functional calculus-disabling mode) GC1 in a case where a calculator app is activated by the terminal 10 of each lecture attendant in an examination of the mathematics.

FIG. 5B is a view illustrating a calculator screen (general calculator mode (functional calculus-disabling mode) GC1 in a case where the calculator app is activated by the terminal 10 of each lecture attendant in an examination of the mathematics. In this manner, the lecture attendant terminal 10 visualizes the presence of the function restriction.

Specifically, in the examination of mathematics, if the calculator app (12b) is activated by the lecture attendant terminal 10 of each lecture attendant K1, K2, . . . (step S7 (Yes)), the CPU 11 establishes a connection to the access point AP(2) and acquires the identification name thereof <ssid name="wifi_for_examination"> (step S8, S9).

Then, based on the app function restriction information 12d (see FIG. 2) registered in the storage unit 12, the CPU 11 determines the scientific calculator mode (general calculator mode (functional calculus-disabling mode) "1" with the function restriction, from the restriction information <app name="calculator">1</app> associated with the identification name <ssid name="wifi_for_examination"> of the access point AP(2) (step S10, S11 (Yes)), and causes the touch panel-equipped display unit 17 to display, as illustrated in FIG. 5B, the calculator screen (general calculator mode (functional calculus-disabling mode)) GC1 with the function restriction, in which a check mark is set in the check box of the general calculator (step S12).

Thereby, during the examination of mathematics (e.g. an examination of trigonometric functions), even when each lecture attendant uses the calculator app (12b), the lecture attendant can utilize only calculation functions of a general calculator, excluding functional calculus functions, and the examination can properly be advanced.

Hereinafter, a description will be given of a case in which the app function restriction information 12d (see FIG. 2) of the present embodiment is registered in the lecture attendant terminal 10, and, like the above-described lecture and examination of mathematics, the access point AP(1) [identification name <ssid name="wifi_for_lesson"> ] is used in a lecture of English and the access point AP(2) [identification name <ssid name="wifi_for_examination">] is used in an examination of English.

Specifically, in the lecture of English, if the dictionary app (12b) is activated by the lecture attendant terminal 10 of each lecture attendant K1, K2, . . . (step S7 (Yes)), the CPU 11 determines, based on the app function restriction information 12d (see FIG. 2), the English dictionary selectable mode "0" without the function restriction, from the restriction information <app name="dictionary">0</app> of the dictionary app associated with the identification name <ssid name="wifi_for_lesson"> of the access point AP(1) (step S10, S11 (No)), and causes the dictionary app (12b) to operate with the English-related dictionary data being also selectable (step S13).

Thereby, during the lecture of English, each lecture attendant can advance learning by utilizing all dictionary data which are available by the dictionary app (12b).

In addition, in the examination of English, if the dictionary app (12b) is activated by the lecture attendant terminal 10 of each lecture attendant K1, K2, . . . (step S7 (Yes)), the CPU 11 determines, based on the app function restriction information 12d (see FIG. 2), the English dictionary unselectable mode "1" with the function restriction, from the restriction information <app name="dictionary">1</app> of the dictionary app associated with the identification name <ssid name="wifi_for_examination"> of the access point AP(2) (step S10, S11 (Yes)), and causes the dictionary app (12b) to operate with the English-related dictionary data being unselectable (step S12).

Thereby, during the examination of English, even when each lecture attendant uses the dictionary app (12b), the lecture attendant can utilize only dictionary functions excluding English-related dictionary data, and the examination can properly be advanced.

In the above-described embodiment, the function restrictions of the calculator app and dictionary app were described. Target apps of the restriction formation are not limited to these. For example, when an examination in which figures are drawn is conducted, the app function restriction information 12d, in which the restriction information of the figure app is described, may be registered in the lecture attendant terminal 10. When an examination in which an angle is calculated from an expressed figure is conducted, the app function restriction information 12d, in which the restriction information of the measurement app is described, may be registered in the lecture attendant terminal 10.

Besides, for example, the app function restriction information 12d, in which restriction information that restricts (prohibits) access to an external site is described, may be registered in the lecture attendant terminal 10. Thereby, for example, during the connection to the access point AP in the school, it is also possible to prohibit access to a Web site on the external communication network (Internet) N by an app of a browser.

Thus, according to the tablet terminal 10 (communication apparatus) with the above configuration, the app function restriction information 12d is generated in advance, which describes the restriction information in which the app name of the app used in a lecture course and the function restriction level "0" (without restriction) of the app name are associated with the connection ID <ssid name="wifi_for_lesson"> of the access point AP(1) used during the lecture, and which also describes the restriction information in which the app name and the function restriction level "1" (with restriction) of the app name are associated with the connection ID <ssid name="wifi_for_examination"> of the access point AP(2) used during the examination of the lecture. In addition, the app function restriction information 12d is registered, for example, from the lecturer's tablet terminal 20 (communication apparatus) to the lecture attendant's tablet terminal 10

(communication apparatus) by establishing a communication connection between the tablet terminals 20 and 10. If the app used in the lecture course is activated in the lecture attendant's tablet terminal 10, the lecture attendant's tablet terminal 10 is connected to the network via the access point AP(1) or AP(2), and acquires the connection ID of the access point AP(n) ["n" is a natural number]. Then, the app is executed without the function restriction during the lecture and is executed with the function restriction during the examination, in accordance with the restriction information "0" or "1" of the app, which is described in the registered app function restriction information 12d associated with the acquired connection ID.

Thereby, for example, during the lecture of mathematics, the calculator app is operated without the function restriction. On the other hand, during the examination, the calculator app is operated by restricting a part of the functions (e.g. functional calculus function) of the calculator app. Further, during the lecture of English, the dictionary app is operated without the function restriction. On the other hand, during the examination, the dictionary app is operated by restricting a part of the functions (e.g. English-related dictionary select function) of the dictionary app.

Therefore, according to the tablet terminal 10 (communication apparatus) with the above-described configuration, a part of functions of an application program can properly be restricted as needed.

As regards the tablet terminal 10 (communication apparatus) of the present embodiment, the case was described in which after the application program is activated by the CPU 11, the tablet terminal 10 (communication apparatus) is connected to the communication network N via the access point AP(1) or AP(2). In an alternative configuration, the tablet terminal 10 may be connected to the communication network N upon activation (power ON) of the tablet terminal 10.

The methods of the processes by the tablet terminal 10 (communication apparatus) described in the above embodiments, that is, the methods of the terminal processes illustrated in the flowchart of FIG. 3 can be stored and distributed as programs executable by the CPU (processor) that is the control unit in the external recording medium such as a memory card (for example, ROM card or RAM card), magnetic disk (for example, floppy (trademark) disk or hard disk), optical disk (for example, CD-ROM or DVD), or semiconductor memory. The CPU (processor) of the communication apparatus loads a program stored in the external recording medium into the storage device, and controls the operation according to the loaded program. The CPU (processor) can therefore implement the restriction function of app functions, which has been described in the above embodiments, and can execute the same processes as in the embodiments.

The data of the program for implementing the methods can be transmitted in the form of program codes on the communication network (N). The data of the program can be loaded from the program server (30) connected to the communication network (N) into the communication apparatus and can be stored in the storage device. This can implement the above-described restriction function of app functions.

In the above embodiments, the app function restriction information 12d is created in advance in the lecturer terminal (tablet terminal) 20, and is transmitted from the lecturer terminal 20 to the lecture attendant terminal (tablet terminal) 10. Alternatively, the app function restriction information 12d may be forcibly transmitted to each lecture attendant terminal 10 from a beacon which is provided in advance in a facility such as a classroom.

In the above embodiments, after the application program 12b is activated (step S7 (Yes)), the lecture attendant terminal 10 is connected to the communication network N (step S8). Alternatively, before the application program 12b is activated, the lecture attendant terminal 10 may be connected to the communication network N (step S8), may acquire the identification name <ssid name> that is the connection ID of the connected access point AP(1) or AP(2) (step S9), may determine the app function restriction information 12d is registered (stored) in the storage unit 12 (step S10), may determine whether the function restriction is present or absence (step S11), may set the restriction mode (step S12) or normal mode (step S13), based on the determination result of step S10 or step S11, and may then activate the application program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication method comprising:
causing a processor to:
acquire identification information of an external wireless device from the external wireless device, wherein the external wireless device is a wireless access point;
read, from a memory, function restriction information associated with the acquired identification information, wherein the function restriction information specifies whether execution of a function of an application program is to be restricted or unrestricted; and
set an executable function of an activated application program in accordance with the read function restriction information.

2. The communication method of claim 1, wherein the function restriction information has a data structure in which the identification information of the wireless device is associated with application information indicative of a name of the application program and a function restriction level of the application program.

3. The communication method of claim 2, further comprising causing the processor to determine that a name of the activated application program is included in the name of the application program indicated by the application information associated with the acquired identification information, and causing the processor to set the executable function of the activated application program in accordance with the function restriction level of the application program indicated by the application information associated with the identification information of the wireless device.

4. The communication method of claim 1, wherein the function restriction information includes, as the identification information, mode information indicative of one of a lesson mode and an examination mode, and the executable function of the application program is set in accordance with the function restriction information associated with the mode information acquired from the external wireless device.

5. The communication method of claim 4, wherein the executable function of the application program in the lesson mode is extended, compared to the executable function of the application program in the examination mode.

6. The communication method of claim 1, wherein the external wireless device transmits the identification information of the external wireless device, and the processor sets the executable function of the application program in accordance with the read function restriction information, only within a range in which the processor is capable of receiving the identification information.

7. The communication method of claim 1, wherein the executable function of the application program, which is set in accordance with the function restriction information, is visualized.

8. A communication apparatus comprising:
a processor; and
a memory,
the processor being configured to:
acquire identification information of an external wireless device from the external wireless device, wherein the external wireless device is a wireless access point;
read, from the memory, function restriction information associated with the acquired identification information, wherein the function restriction information specifies whether execution of a function of an application program is to be restricted or unrestricted; and
set an executable function of an activated application program in accordance with the read function restriction information.

9. The communication apparatus of claim 8, wherein the function restriction information has a data structure in which the identification information of the wireless device is associated with application information indicative of a name of the application program and a function restriction level of the application program.

10. The communication apparatus of claim 9, wherein when it is determined that a name of the activated application program is included in the name of the application program indicated by the application information associated with the acquired identification information, the executable function of the activated application program is set in accordance with the function restriction level of the application program indicated by the application information associated with the identification information of the wireless device.

11. The communication apparatus of claim 8, wherein the function restriction information includes, as the identification information, mode information indicative of one of a lesson mode and an examination mode, and the executable function of the application program is set in accordance with the function restriction information associated with the mode information acquired from the external wireless device.

12. The communication apparatus of claim 11, wherein the executable function of the application program in the lesson mode is extended, compared to the executable function of the application program in the examination mode.

13. The communication apparatus of claim 8, wherein the external wireless device transmits the identification information of the external wireless device, and the processor sets the executable function of the application program in accordance with the read function restriction information, only within a range in which the processor is capable of receiving the identification information.

14. The communication apparatus of claim 8, further comprising a display configured to visualize the executable function of the application program, which is set in accordance with the function restriction information.

15. A non-transitory recording medium having a program recorded thereon that is executable to control a computer of a communication apparatus having a processor to:
acquire identification information of an external wireless device from the external wireless device, wherein the external wireless device is a wireless access point;
read, from a memory, function restriction information associated with the acquired identification information, wherein the function restriction information specifies whether execution of a function of an application program is to be restricted or unrestricted; and
set an executable function of an activated application program in accordance with the read function restriction information.

16. The communication method of claim 1,
wherein the function of the application program includes a first function and a second function, wherein the function restriction information associated with the acquired identification information specifies that the function of the application program is to be unrestricted, and
wherein the method comprises setting the executable function of the application program in accordance with the function restriction information such that the first function and the second function are both executable.

17. The communication apparatus of claim 8,
wherein the function of the application program includes a first function and a second function, and
wherein processor sets the executable function of the application program in accordance with the function restriction information such that:
in a case in which the function restriction information associated with the acquired identification information specifies that the function of the application program is to be unrestricted, the first function and the second function are both executable, and
in a case in which the function restriction information associated with the acquired identification information specifies that the function of the application program is to be restricted, the first function is executable and the second function is not executable.

18. The non-transitory recording medium of claim 15,
wherein the function of the application program includes a first function and a second function, and
wherein the program is executable to control the computer to set the executable function of the application program in accordance with the function restriction information such that:
in a case in which the function restriction information associated with the acquired identification information specifies that the function of the application program is to be unrestricted, the first function and the second function are both executable, and
in a case in which the function restriction information associated with the acquired identification information specifies that the function of the application program is to be restricted, the first function is executable and the second function is not executable.

19. The communication method of claim 1,
wherein the function of the application program includes a first function and a second function,
wherein the function restriction information associated with the acquired identification information specifies that the function of the application program is to be restricted, and
wherein the method comprises setting the executable function of the application program in accordance with the function restriction information such that the first function is executable and the second function is not executable.

* * * * *